United States Patent [19]
Atkins

[11] 3,843,107

[45] Oct. 22, 1974

[54] ADJUSTABLE DUAL ACTION SHOCK ABSORBER

[76] Inventor: Douglas R. Atkins, 74 Wayside Dr., San Antonio, Tex. 78213

[22] Filed: Feb. 9, 1972

[21] Appl. No.: 224,651

[52] U.S. Cl............... 267/64 R, 188/287, 188/313, 188/322
[51] Int. Cl................................................ F16f 9/44
[58] Field of Search .......... 188/281, 287, 297, 299, 188/313, 318, 322, 315, 312, 300; 267/64 R

[56] References Cited
UNITED STATES PATENTS

| | | | |
|---|---|---|---|
| 1,299,131 | 4/1919 | Coleman............................. | 188/287 |
| 1,613,782 | 1/1927 | Bauer.................................. | 188/313 |
| 1,829,540 | 10/1931 | Reeves................................ | 188/313 |
| 2,018,312 | 10/1935 | Moulton............................. | 188/318 |
| 2,213,823 | 9/1940 | Renfer............................. | 188/281 X |
| 2,792,915 | 5/1957 | Smith.................................. | 188/313 |
| 3,321,210 | 5/1967 | Delcher.......................... | 188/313 X |
| 3,528,531 | 9/1970 | Schweller et al. .................. | 188/313 |

*Primary Examiner*—George E. A. Halvosa

[57] ABSTRACT

A novel adjustable dual action shock absorber which may be designed in either of several different forms presented in the present patent application, and wherein in a first form thereof, the device consists of a piston within an inner chamber that is centrally located within an outer chamber, one end of the piston extending outwardly of the shock absorber for securement to a chassis while a lower end of the shock absorber is secured to an axile supporting assembly, the lower end of the inner chamber being provided with base jets, and wherein on a down stroke of the piston, hydraulic fluid is forced out of the base jets and up the outer chamber so to enter the upper portion of the inner chamber above the piston head.

2 Claims, 18 Drawing Figures

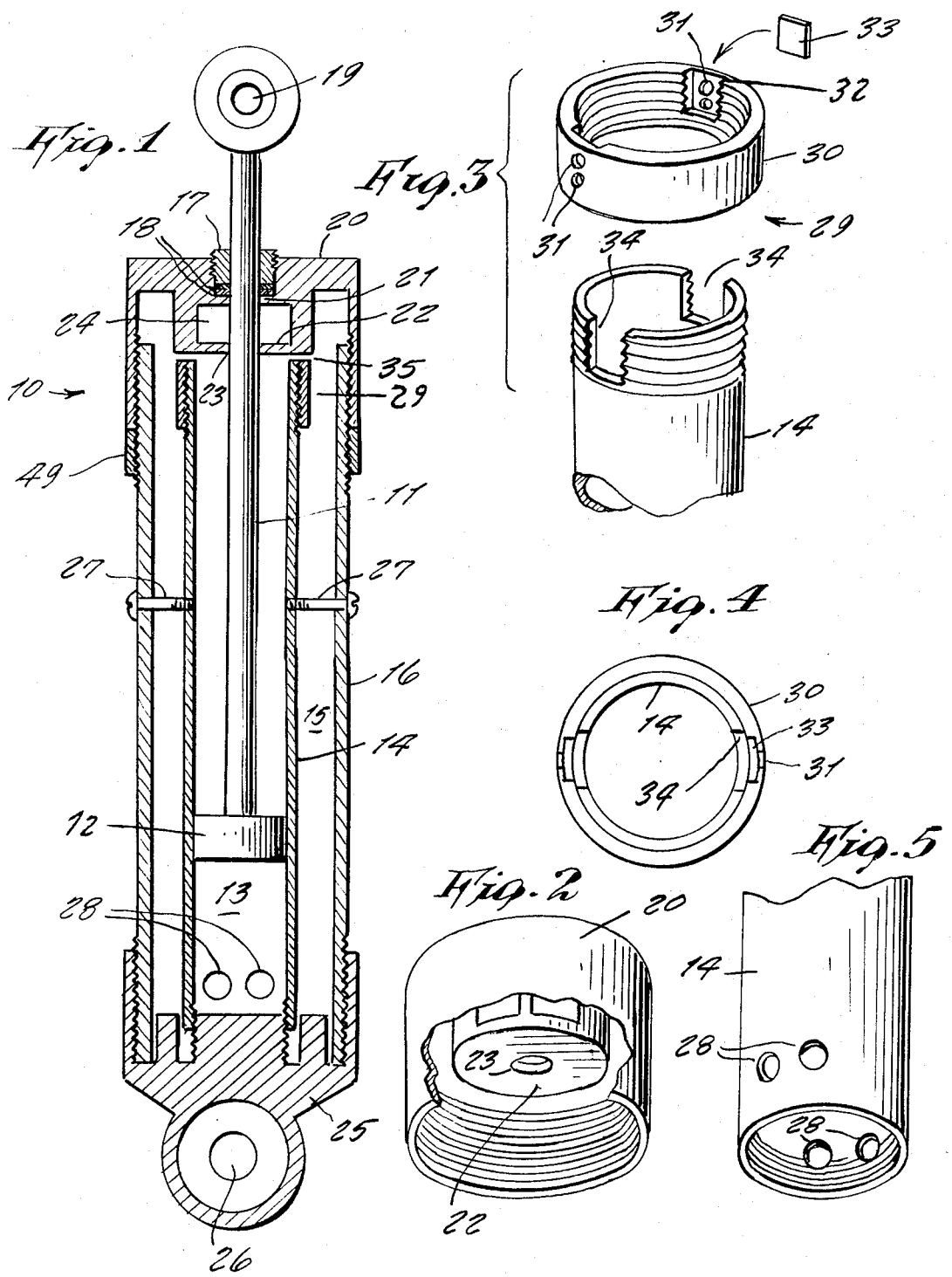

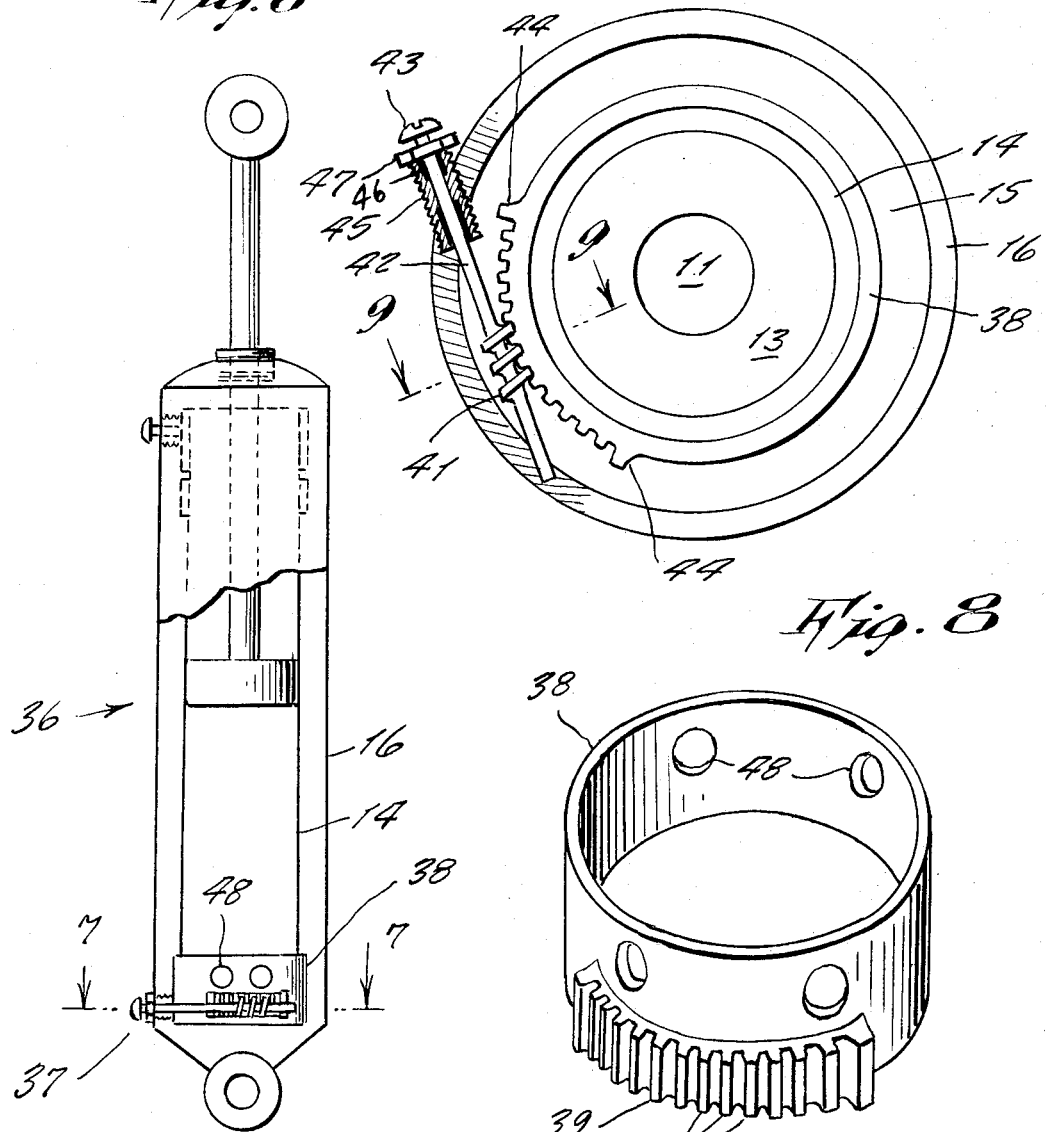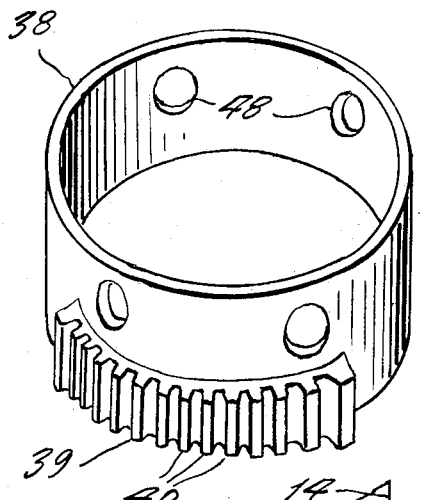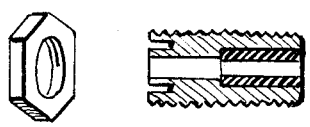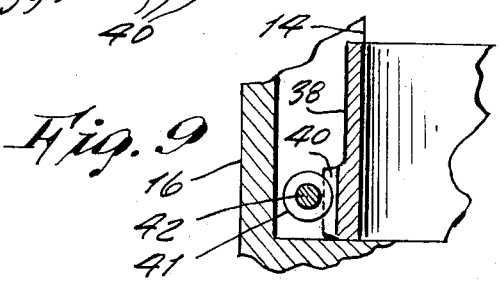

ADJUSTABLE DUAL ACTION SHOCK ABSORBER

This invention relates generally to shock absorbers.

A principal object of the present invention is to provide a shock absorber that is of dual action.

Yet another object of the present invention is to provide a dual action shock absorber which is adjustable.

Yet another object of the present invention is to provide an adjustable dual action shock absorber wherein there are only two moving parts both of which are extremely durable, so that the shock absorber would last a life time of any automotive vehicle.

Still another purpose of the present invention is to provide an adjustable dual action shock absorber wherein a customer could rebuild a suspension system of his automobile at a low cost, especially if a spring helper or leveler kit is used.

Other objects of the present invention are to provide an adjustable dual action shock absorber which is simple in design, inexpensive to manufacture, rugged in construction, easy to use and efficient in operation.

These and other objects will be readily evident upon a study of the following specification and the accompanying drawings wherein:

FIG. 1 is a cross sectional view of one form of the present invention.

FIG. 2 is a detail of an upper end member.

FIG. 3 is a detail of the upper end of the outer cylinder and associated parts.

FIG. 4 is a plan view thereof.

FIG. 5 is a detail view of a lower end of the inner cylinder.

FIG. 6 is a side elevation view shown partly broken away and illustrating a modified design of the present invention.

FIG. 7 is an enlarged cross sectional view taken on line 7—7 of FIG. 6.

FIG. 8 is a perspective view of a detail thereof.

FIG. 9 is an enlarged cross sectional view taken on line 9—9 of FIG. 7.

FIG. 10 is a detail of parts shown in FIG. 7 and shown greatly enlarged.

Figure 11:
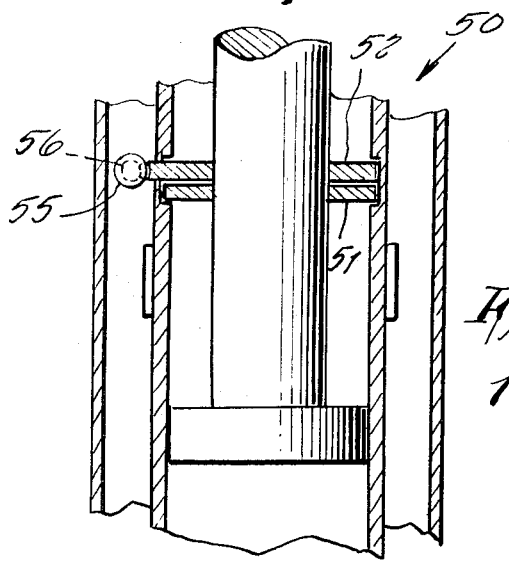
FIG. 11 is a fragmentary side cross sectional view of a further modified design of the invention.
Figure 12:
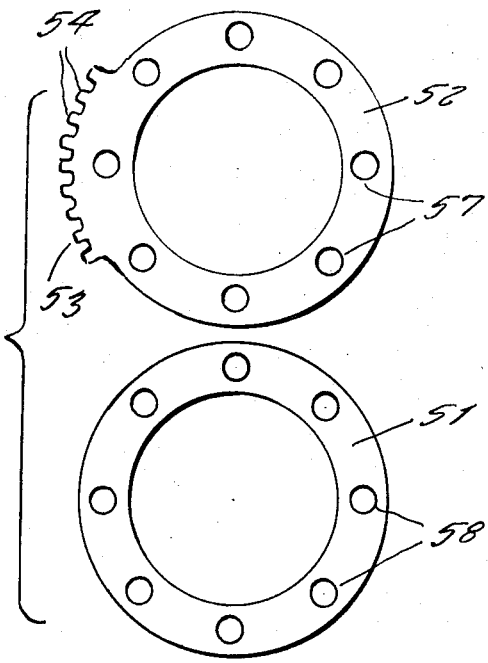
FIG. 12 is a plan view of parts shown in FIG. 11.

Referring now to the drawings in detail, and more particularly at this time to FIGS. 1 through 5 thereof at this time, the reference numeral 10 represents an adjustable dual action shock absorber according to the present invention wherein there is a piston rod 11 having a piston head 12 at one end thereof, the piston head being slidable within an inner chamber 13 of an inner cylinder 14 that is centrally located within an outer chamber 15 of an outer cylinder 16. The piston rod extends through a nut 17 and washers 18 of steel rubber or nylon so to form a perfect seal around the piston rod for retaining a vacuum. The outwardly extending end of the piston rod has an opening 19 for securement to an automobile body. The nut 17 is screw threaded in a top cap 20 having an opening 21 through which the piston extends. A baffle plate 22 is formed on a bottom of the cap, the baffle having central opening 23 through which the piston rod extends. A space 24 is formed above the baffle 23. The piston rod extends through the hollow space 24, as shown in FIG. 1.

The outer cylinder 16 is threaded at both ends so to engage the top cap 20 and also to threadingly engage a base cap 25. The lower end of the base cap 25 has an opening 26 for securement to the axile assembly. Radially inwardly extending screws 27 support the inner cylinder 14 concentrically respective to the outer cylinder. The inner cylinder 14 is screw threaded to the base cap 25, and the lower portion of the cylinder is provided with pairs of jet openings 28 so that the inner chamber 13 can communicate with the outer chamber 15. The upper end of the inner cylinder is screw threaded to a displacement valve assembly 29 which includes a short cylindrical sleeve 30 having a pair of jets 31 on opposite sides thereof which communicate with a sloted recess 32 formed on the inner side of the sleeve 30, the slotted recess 32 each being adapted to receive a slat or flat plate 33 therein. As shown in FIG. 3, it is noted that the upper end of the inner cylinder 14 is provided with slots 34 on diametrically opposite sides so that they can align with the recessed slots 32 of the sleeve. The slats 33 comprise within strips of spring steel material so to fit tightly into the recess 32, the back of the slat being flush with the sleeve. The size of the slat must not touch the walls of the recess 32, and the top must not extend above the sleeve nor touch the piston rod when the slat is in a forward or opened position. The slat must be highly flexible, yet hard and strong enough so to with stand the pressure.

In operation, the displacement valve assembly 29 functions as follows:

The valve screws down around the inner cylinder, the top being flush with the top of the cylinder. On the down stroke of the piston, the liquid in the outer chamber enters through the sleeve jets and pushes the slat forward into open position so to fill the inner chamber. On the up stroke, the liquid is pushed up against the slat forcing it back against the sleeve to a closed position. The valve could also be fitted above the base jets to facilitate filling of the inner chamber on the up stroke.

The fluid used in the shock absorber should have the following properties:

It should have small viscosity for quicker filling of the inner chamber. It should have low co-efficient of volume expansion for a minimum vacuum space. It should have a high boiling point, a low freezing point and the oil base to minimize friction. The exception to the small viscosity for quicker filling of the inner chamber could be mercury. If mercury were used, a small piston head and chambers could keep the cost down but heat disapation might become a problem. The fluid should be heated to a temperature above the maximum shock absorber working temperature, and the shock absorber is then filled to capacity. Upon cooling, the vacuum is formed the top cap and the base cap are screwed down to a maximum during filling.

The following is a concept of the operation. On the down stroke, fluid is forced out of the base jets and up the outer chamber to enter the inner chamber through the displacement valve assembly and the baffle gap. On the up stroke, fluid closes the displacement valve assembly and forces the fluid out through the baffle gap identified with the reference numeral 35. The fluid then moves down the outer chamber and into the base jets. To increase the resistance on the up stroke, the outer cylinder is held in place and the top cap is screwed down to narrow the baffle gap 35. To increase the resistance of the down stroke, the outer cylinder is screwed down on the base cap. The inner cylinder turns as the outer cylinder turns and the base jets will thus be partially blocked. The locking nut 49 secures top caps in place. When the outer cylinder is screwed down all the way, and the top cap screwed own all the way in that order, maximum dual shock absorber action is obtained. When the outer cylinder is screwed up to completely unblock the base jets 28, single absorber actions occurs. Most any degree of action can be obtained by adjusting the top cap and the outer cylinder. Pressure in the inner chamber depends upon the area of the base jets and the baffle gap as well as the force applied. There will be negilable pressure in the outer chamber. Heat builds up but should be no problem as the fluid will be pumped back and forth over a large metal area in contact with the outside air.

It will now be evident that this form of the invention has additional advantages such as the cost in manufacturing being low considering that the shock absorber can be adjusted to any action that is wanted, therefore one will replace many shock absorbers with different fixed actions.

References now made to FIGS. 6 through 10 of the drawings wherein two different valve systems are indicated. The rotating sleeve system may be better than the adjustable perforated plates and ring system, however a manufacture could use either or a combination of the two. These additions are not intended to change the basic concept of the shock absorber but rather to extablish a system where the manufacture would have a choice of the many possible combinations.

In FIGS. 6 through 10, the adjustable dual action shock absorber 36 is shown to include an adjusting valve 37. There is a rotating sleeve 38 designed to fit around the inner cylinder 14, the rotating sleeve being provided with an arcuate toothed rack on its outer side as shown at 39. The teeth 40 of the rack 39 engage a worm gear 41 forming a part of an adjusting screw 42, the head of which indicated by reference numeral 43 is located externally of the shock absorber. Thus the adjusting screw can be turned so as to rotate the sleeves 38. As shown in FIGS. 7 and 8, it is to be noted that the end teeth 44 of the rack 39 are over sized so that they serve as stops and prevent rotation of the sleeve beyond engagement with the adjusting screw. The adjusting screw extends through a rubber bushing 45 so to prevent leakage there through. The bushing is provided with slits 46 on one end thereof. The cylindrical outer side of the rubber bushing is threaded so to be screw threaded in the outer cylinder 16 and so to threadingly engage a locking nut 47.

As shown in FIG. 8, it is to be noted that the sleeve 38 is provided with a plurality of jets 48 there through and which can be aligned with the jets 28 of the inner cylinder by rotating the rotatable sleeve 38. Thus the jets 48 can partially block or open the base jets 28, or the top jets. The adjusting valve would eliminate parts 27, 49 and the baffle plate 22. Thus there would be no need to have movable cylinders, caps and plugs.

References now made to FIGS. 11 through 14. In this form of the invention, the adjustable dual action shock absorber 50 includes, shown in FIG. 11 wherein there is a fixed perforated ring 51 that is in a stationary position. There is also a rotatable perforated ring 52 that incorporates a toothed rack 53 on its outer edge, the rack 53 being comprised of a series of teeth 54 that engage a worm gear 55 on an adjusting screw 56, the adjusting screw having a head that extends outwardly of the shock absorber in a similar manner as the above described adjusting screw 42. The movable perforated ring 52 has a series of perforated openings 57 there through, and the fixed ring 51 has a series of perforated openings 58 there through. Thus the rotatable ring 52 can be rotated so that the openings 57 and 58 can be partially or fully aligned with each other, as desired.

Figure 13:
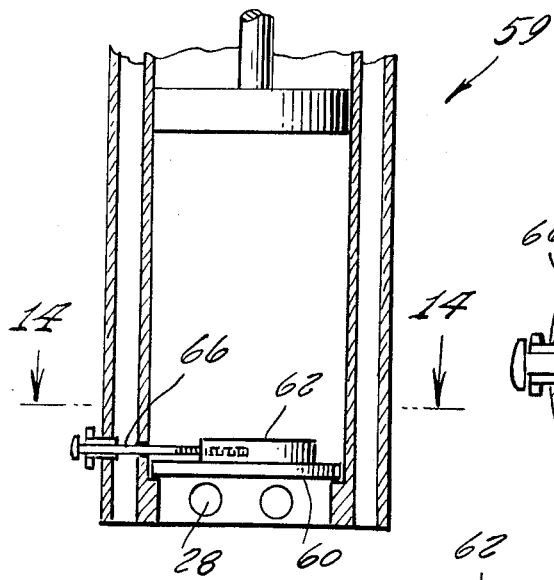
FIG. 13 is a cross sectional view of yet another modified design of the invention.
Figure 14:
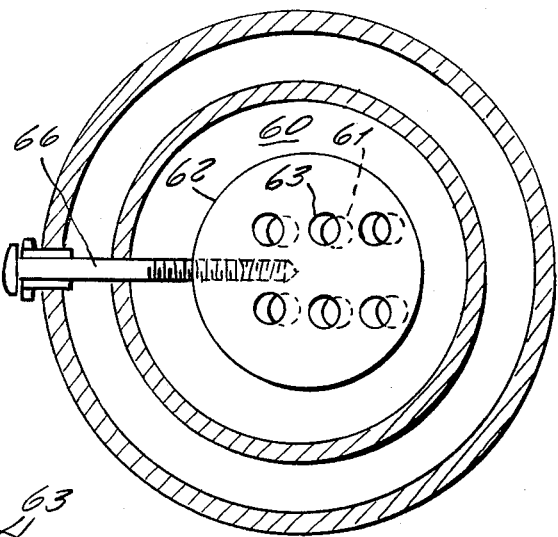
FIG. 14 is an enlarged cross sectional view taken on line 14—14 of FIG. 13.
Figure 15:
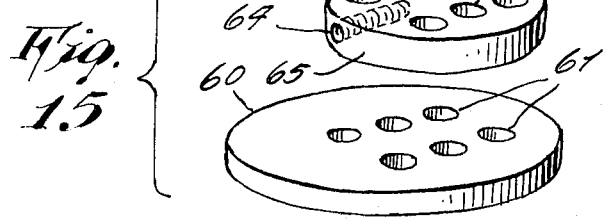
FIG. 15 is a perspective view of parts shown in FIGS. 13 and 14.

References now made to FIGS. 13 through 15 wherein the adjustable dual action shock absorber 59 includes a fixed plate 60 having perforated openings 61 there through, and a slideable plate 62 having a series of perforated openings 63 there through. A threaded opening 64 in a side edge 65 of the slideable plate 62 is threadingly engagable with an adjusting screw 66 which is similar to the above described adjusting screw 42 that extends outwardly of the shock absorber as above described. Thus in this form of the invention, the slideable plate 62 can be moved respective to the fixed or stationary plates 60 so that the openings 61 and 63 can be selectively partially or totally aligned with each other.

Figure 16:
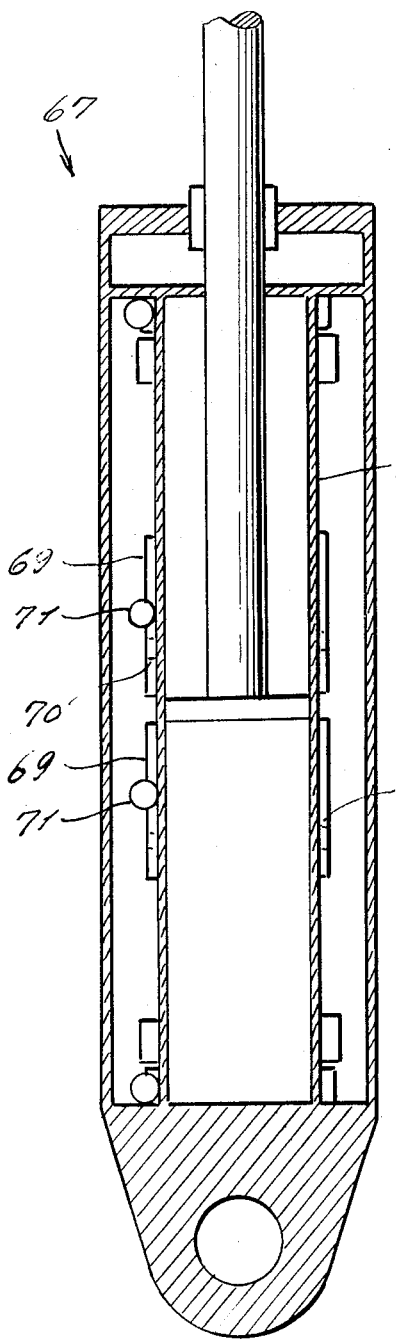
FIG. 16 is a side cross sectional view of still another modified design of the invention.
Figure 17:
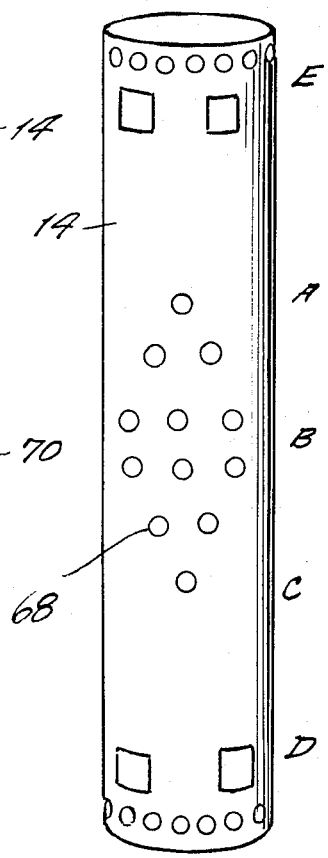
FIG. 17 is a perspective view of an inner cylinder thereof.

References now made to FIGS. 16 and 17 of the drawings wherein there is an adjustable dual action shock absorber 67. In this form of the invention, jets 68 are drilled in the middle of the inner cylinder, starting at the longitudinal center of the cylinder and decreasing in jet number toward both ends of the cylinder, as is best shown in FIG. 17. Rotating sleeve valves 69 are fitted over the inner cylinder so to cover the jets from point A to point B as well as from point C to point D. The rotating sleeve valves have jets which correspond in location to those on the inner cylinder so to partially block the inner cylinder jets. The rotating sleeve valve opening are indicated with the reference numeral 70. The rotating sleeve valve are rotatable in a similar manner as above described and wherein there is an adjusting screw with worm gear as indicated at 71.

The concept of this form of the invention comprises the following:

When the vehicle is stationary, the piston head is at point B. The maximum distance allowable between the sprung and the un-sprung weight is point D which consists of compression of the springs whereas a point E comprises a full extionsion of the springs. The resistance or damping action increases in proportions at a distance the piston moves from point B either up or down. The arrangement of the mid cylinder jets from A to C will enable the spring to work fast and permit a soft ride during normal riding conditions. During hard breaking, quick turns and harsh road conditions, the piston will be slowed by the increase resistance from points A to E and C to D. The action can be adjusted by the rotating sleeve valves 69.

Figure 18:
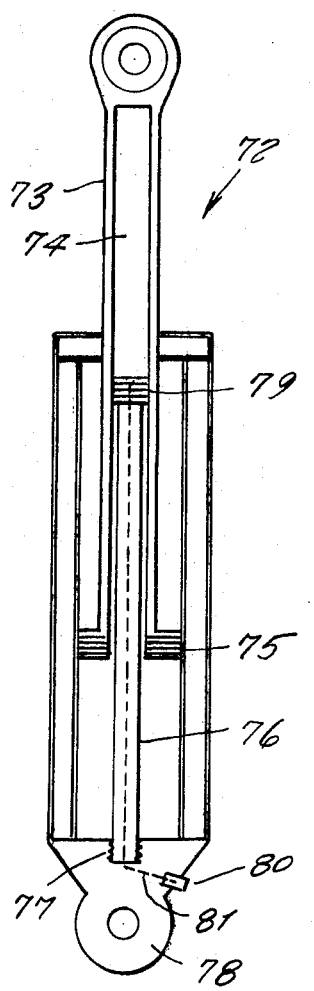
FIG. 18 is a side cross sectional view of a still further modified design of the invention.

References now made to FIG. 18. In this form of the invention, the adjustable dual action shock absorber 72 comprises an over sized shock absorber rod 73 with a bored out central compression chamber 74. A series of washer type rings 75 form a piston head and make a seal to prevent leakage of fluid up into the compression chamber 74.

A solid steel rod 76 is inserted into the bore of the shock absorber rod and screwed at 77 into a base 78 of the shock absorber. A series of washer type rings 79 serve to insure a seal. An air valve 80 is provided. A small air passage 81 is drilled through the cylinder.

In this form of the invention the comcept of operation is as follows:

Compressed air is forced into the compression chamber 74 to compliment the springs. The potential use is as follows:

It can be used like over load springs and a shock absorber. It can be used in conjunction with leveler type springs to form the entire suspension system. This shock absorber could be the suspension system without any type of springs on some type of vehicles. The compressed air would force the un-sprung weight downward on bumps, ruts, and the like so to give superior traction. The most elaborate set up would be compressor and air hose attachments being built on the vehicle; guages and switches for each shock absorber being provided for inflation while driving, and the entire structure being constructed so to allow disassembly and easy over haul when necessary.

Thus there is provided an adjustable dual action shock absorber which may be constructed in any of different forms as above described.

What I now claim is:

1. An adjustable dual action shock absorber consisting of;
   a. an adjustable top cap attached to an outer cylinder, said top cap being separated from the top of an inner cylinder located centrally within said outer cylinder by a baffle plate constructed on the bottom of said top cap to form a baffle gap, said baffle gap opens or constricts by adjusting said top cap to control resistance of hydraulic fluid between an inner chamber and an outer chamber, said inner and outer chambers being the areas formed within said inner cylinder and between said outer cylinder and said inner cylinder respectively,
   b. an adjustable base cap attached to the lower end of said outer cylinder, the inner part of said base cap being fitted around and within the base of said inner cylinder, said inner cylinder having constructed therein base jet openings to communicate between said inner chamber and said outer chamber, that part of said base cap fitted around said inner cylinder being constructed to allow partial blockage of said base jet openings to control resistance of hydraulic fluid between said inner chamber and said outer chamber, said base cap being externally constructed for attachment to an axle assembly,
   c. said inner cylinder being attached to said outer cylinder by interconnecting screws allowing said inner cylinder to move simultaneously with said outer cylinder, rotation of said outer cylinder allows said inner cylinder to alter the orifice of said base jet openings thus permitting adjustment when said base cap is firmly affixed to a vehicle,
   d. a spring slat valve within a sleeve fitted around said inner cylinder to open when hydraulic fluid is entering said inner chamber and to close when hydraulic fluid is forced from within said inner chamber into said outer chamber, closing and opening of said slat valve is relative to the movement of a piston, said inner and outer chambers being suitably filled with a damping substance such as hydraulic fluid,
   e. a screw threaded nut within said top cap having an opening through which a piston rod extends outwardly, said nut having within multiple washers forming a seal, the area beneath said nut being void of hydraulic fluid in the amount of the volume displaced by said piston rod and allowing for coefficient of volume expansion, said piston rod being externally constructed for attachment to a chassis, f. said piston rod being attached to a piston within said inner chamber, said piston rod being constructed with an internal longitudinal air compression chamber, a rod being affixed to said base cap within said inner chamber, said affixed rod being inserted into said longitudinal chamber of said piston rod, said affixed rod at its upper end being provided with a series of washer type rings to provide an airtight seal preventing a mixture of air with said hydraulic fluid within said inner chamber, an air valve within said base cap, said air valve being in communication with the lower end of said affixed rod, an air passage through said affixed rod being in communication with said longitudinal air compression chamber, said affixed rod as an alternate may be constructed as a cylinder, the longitudinal center permitting compression of air there within, to allow for a relatively light weight shock absorber for large vehicles, said air compression assembly permits an increase or decrease of air pressure within said air compression chamber to assist or to form a spring action,
   g. said piston rod on a downward movement compresses air within said air compression chamber, said piston simultaneously forces said hydraulic fluid from within said inner chamber into said outer chamber through said adjustable base jet openings, said hydraulic fluid simultaneously enters the upper part of said inner cylinder,
   h. said piston rod on an upward movement allows air expansion within said air compression chamber, said piston simultaneously forces said hydraulic fluid from within said inner chamber into said outer chamber through said adjustable baffle gap, said hydraulic fluid simultaneously enters the lower part of said inner chamber.

2. The shock absorber system as set forth in claim 1, in which; the basic inner structure of said base cap being constructed and adaptable to function at the upper end of said inner cylinder, particularly referring to said base jet openings and that part being fitted to the base of said inner cylinder, and allowing for the structure required permitting the outward extension of said piston rod.

* * * * *